(12) United States Patent
Li et al.

(10) Patent No.: US 11,594,889 B2
(45) Date of Patent: Feb. 28, 2023

(54) OPTIMIZED ENERGY INTERCONNECTION SYSTEM FOR URBAN RAILWAY TRAIN

(71) Applicant: CRRC ZHUZHOU ELECTRIC LOCOMOTIVE RESEARCH INSTITUTE CO., LTD., Hunan (CN)

(72) Inventors: Hongbo Li, Hunan (CN); Zhixue Zhang, Hunan (CN); Zihao Huang, Hunan (CN); Yilong Duan, Hunan (CN); Wenguang Luo, Hunan (CN); Wenqing Mei, Hunan (CN)

(73) Assignee: CRRC ZHUZHOU ELECTRIC LOCOMOTIVE RESEARCH INSTITUTE CO., LTD., Zhuzhou (CN)

( * ) Notice: Subject to any disclaimer, the term of this patent is extended or adjusted under 35 U.S.C. 154(b) by 199 days.

(21) Appl. No.: 17/043,731

(22) PCT Filed: Nov. 2, 2018

(86) PCT No.: PCT/CN2018/113681
§ 371 (c)(1),
(2) Date: Sep. 30, 2020

(87) PCT Pub. No.: WO2020/000843
PCT Pub. Date: Jan. 2, 2020

(65) Prior Publication Data
US 2021/0039500 A1 Feb. 11, 2021

(30) Foreign Application Priority Data
Jun. 29, 2018 (CN) .......................... 201810701547.2

(51) Int. Cl.
*B60L 7/12* (2006.01)
*B60M 3/06* (2006.01)
(Continued)

(52) U.S. Cl.
CPC ........ *H02J 3/36* (2013.01); *B60L 7/12* (2013.01); *B60M 3/06* (2013.01); *H02J 3/06* (2013.01);
(Continued)

(58) Field of Classification Search
CPC .... B60L 7/12; B60L 2200/26; B60L 2240/26; B60M 3/06; H02J 3/06; H02J 3/36;
(Continued)

(56) References Cited

U.S. PATENT DOCUMENTS

| 2015/0027837 A1* | 1/2015 | Lamba | B60L 9/00 191/6 |
|---|---|---|---|
| 2018/0201147 A1* | 7/2018 | Shin | H02J 50/10 |
| 2020/0106268 A1* | 4/2020 | Kawachi | H02J 3/32 |

* cited by examiner

*Primary Examiner* — Lincoln D Donovan
*Assistant Examiner* — Alex W Lam

(57) ABSTRACT

Disclosed is an optimized energy interconnection system for an urban railway train in the technical field of urban railway transportation power supply, for addressing the technical problem that distribution of regenerative braking energy flows cannot be accurately determined. The system includes a DC intermediate bus and a multi-port flow controllable energy router. The multi-port flow controllable energy router can comprehensively control a source and a load connected in parallel on the DC intermediate bus and thus can accurately determine the distribution of regenerative braking energy flows, thereby forming a well-developed system for evaluating usage of the braking energy.

8 Claims, 4 Drawing Sheets

(51) Int. Cl.
*H02J 3/06* (2006.01)
*H02J 3/36* (2006.01)
*H02M 7/483* (2007.01)

(52) U.S. Cl.
CPC ....... *H02M 7/4835* (2021.05); *B60L 2200/26* (2013.01)

(58) Field of Classification Search
CPC ...... H02J 3/30; H02J 3/32; H02J 3/322; H02J 2310/40; H02J 3/28; H02M 7/4807; H02M 7/4835; H02M 1/0074; H02M 1/0077; H02M 3/33584; H02M 5/225; Y02T 90/16
See application file for complete search history.

OPTIMIZED ENERGY INTERCONNECTION SYSTEM FOR URBAN RAILWAY TRAIN

CROSS-REFERENCE TO RELATED APPLICATIONS

This application claims the priority of Chinese patent application CN201810701547.2, entitled "Optimized Energy Interconnection System for Urban Railway Train" and filed on Jun. 29, 2018, the entirety of which is incorporated herein by reference.

FIELD OF THE INVENTION

The present disclosure relates to the technical field of a system for urban railway transportation power supply, and in particular, to an optimized energy interconnection system for an urban railway train.

BACKGROUND OF THE INVENTION

At present, an energy feedback device of an urban railway train (for example, a subway train) usually feeds back braking energy of the train to a 35 kV medium-voltage AC bus or a 400V low-voltage AC bus. The above manner mainly has the following problems.

Since urban railway transportation adopts a DC traction power supply mode, the energy feedback device of the train is activated in accordance with a voltage threshold of a DC traction power grid. As a result, the energy feedback device may be triggered before regenerative braking energy is adequately cycled among trains in adjacent routes, and at this time the braking energy is forcibly fed back to an AC power grid. Furthermore, the regenerative braking energy is cycled between adjacent energy feedback systems and multi-pulse rectification systems, so that a train to be started does not absorb the braking energy but absorbs energy from the power grid, which causes extra electric energy consumption of a traction system. In addition, after the regenerative braking energy is fed back to the AC power grid, flows are not controllable. The flows may be transferred to a started train through multi-pulse rectification, or may be consumed by an auxiliary grid load. Hence, it is difficult to evaluate energy conservation of the energy feedback system.

Besides, most of existing energy systems are connected to the AC power grid via a power transformer. The power transformer has no-load loss and has a large volume, and meanwhile there may be extra reactive power consumption when energy is transferred in the AC power grid.

From another aspect, although the urban railway transportation is a manner of green traveling, electric energy consumed by the urban railway transportation is mostly electric energy generated from coal. With the strengthening of national environmental protection efforts, the subway, as a major consumer of power in cities, will surely increase its proportion of green electric energy. Therefore, some people have proposed a concept of green station, i.e., solar panels are arranged on a roof of a station or a vehicle depot to perform photovoltaic power generation. Currently, photovoltaic power is mainly used in two ways: self-use and transferring surplus power to a grid. However, considering the policy of retreating subsidies for photovoltaic power generation and the reduction of costs for photovoltaic power generation, self-use has become the main form of photovoltaic power utilization. With the expansion of the scale of photovoltaic power plants, it is difficult for an auxiliary system to absorb all the photovoltaic electric energy and the photovoltaic electric energy can be integrated into a traction power grid. Through reasonable capacity configuration and site selection, a designed (overload) capacity of a transformer for a traction power supply system can be reduced to a certain extent.

There are two ways to integrate the photovoltaic electric energy into the traction power grid:

1. a photovoltaic array undergoes a DC-DC conversion and a DC-AC conversion, and is integrated into a 35 kV medium-voltage grid via a power transformer; and 2. a photovoltaic array undergoes a DC-DC boost conversion, and is integrated into a 1500V DC traction power grid.

For the first integration manner, transfer efficiency is high during long-distance energy transfer, but a grid-connected inverter and a grid-connected power transformer are required. The photovoltaic electric energy needs to go through multiple conversion stages (a grid-connected inverter, a grid-connected transformer, a phase-shifting transformer and a multi-pulse rectifier) before being used by a train. Hence, conversion efficiency of a system is greatly reduced.

For the second integration manner, only the DC-DC boost conversion is required, and many intermediate conversion stages are saved. However, for the same amount of photovoltaic power, transmission loss in this line would be larger than in a line of the first integration manner.

Therefore, the existing two ways to integrate the photovoltaic electric energy into the traction power grid have defects of reduced conversion efficiency and large transmission loss.

In addition, an existing urban railway transportation system has relatively stable loads and lacks adjustable loads, and it is difficult to realize optimized scheduling of energy of a subway system.

SUMMARY OF THE INVENTION

The present disclosure provides an optimized energy interconnection system for an urban railway train, for solving a technical problem that distribution of regenerative braking energy flows cannot be accurately determined in the prior art.

The present disclosure provides an optimized energy interconnection system for an urban railway train. The system includes a DC intermediate bus and multi-port flow controllable energy routers. The multi-port flow controllable energy routers are connected to the DC intermediate bus and the DC traction bus respectively, for directionally transferring regenerative braking energy from the DC traction bus.

In an embodiment, there is one multi-port flow controllable energy router or multiple multi-port flow controllable energy routers. The multiple multi-port flow controllable energy routers communicate with each other.

In an embodiment, the multi-port flow controllable energy router includes a reactive power compensation device, an active power filter and a regenerative braking energy feedback device.

In an embodiment, the system further includes a low-voltage DC bus, to which an auxiliary power utilization unit is connected, and each of the multi-port flow controllable energy routers is connected with the low-voltage DC bus.

In an embodiment, the DC intermediate bus is connected with a photovoltaic array in a photovoltaic grid-connected system via a DC/DC converter.

In an embodiment, the DC intermediate bus is further connected with a distributed power generation system. The distributed power generation system includes one or more of footstep generation devices, geothermal heating pumps, fuel cells and micro gas turbines.

In an embodiment, the DC intermediate bus is connected with energy storage elements via an energy converter. The energy storage element includes one or more of storage batteries, supper capacitors and flywheels.

In an embodiment, a load unit is connected to the DC intermediate bus. The load unit includes an electric vehicle charging system which is connected with the DC intermediate bus via an electric vehicle charging converter.

In an embodiment, the voltage of the DC intermediate bus is adjusted by the multi-port flow controllable energy router.

In an embodiment, the multi-port flow controllable energy router is further connected with an AC bus, to make the regenerative braking energy cycled and utilized among trains in an entire route via the AC bus.

Compared with the prior art, the present disclosure has the following advantages.

(1) The multi-port flow controllable energy router can comprehensively control a source and a load connected in parallel on the DC intermediate bus, and thus the multi-port flow controllable energy router can accurately determine the distribution of regenerative braking energy flows, thereby forming a well-developed system for evaluating the usage of braking energy.

(2) By reasonably allocating and scheduling energy of the entire grid with the multi-port flow controllable energy router and by actively transferring the regenerative braking energy directionally, the problem that the regenerative braking energy can only be cycled among trains in adjacent substations due to line impedance of a system without energy feedback can be avoided, so that the regenerative braking energy can be cycled among trains in an entire route of a subway as much as possible, thereby improving a utilization ratio of the regenerative braking energy.

BRIEF DESCRIPTION OF THE DRAWINGS

The present disclosure will be described in a more detailed way below based on embodiments and with reference to the accompanying drawings, in which.

DETAILED DESCRIPTION OF THE EMBODIMENTS

The present disclosure will be further disclosed with reference to the accompanying drawings.

Figure 1:
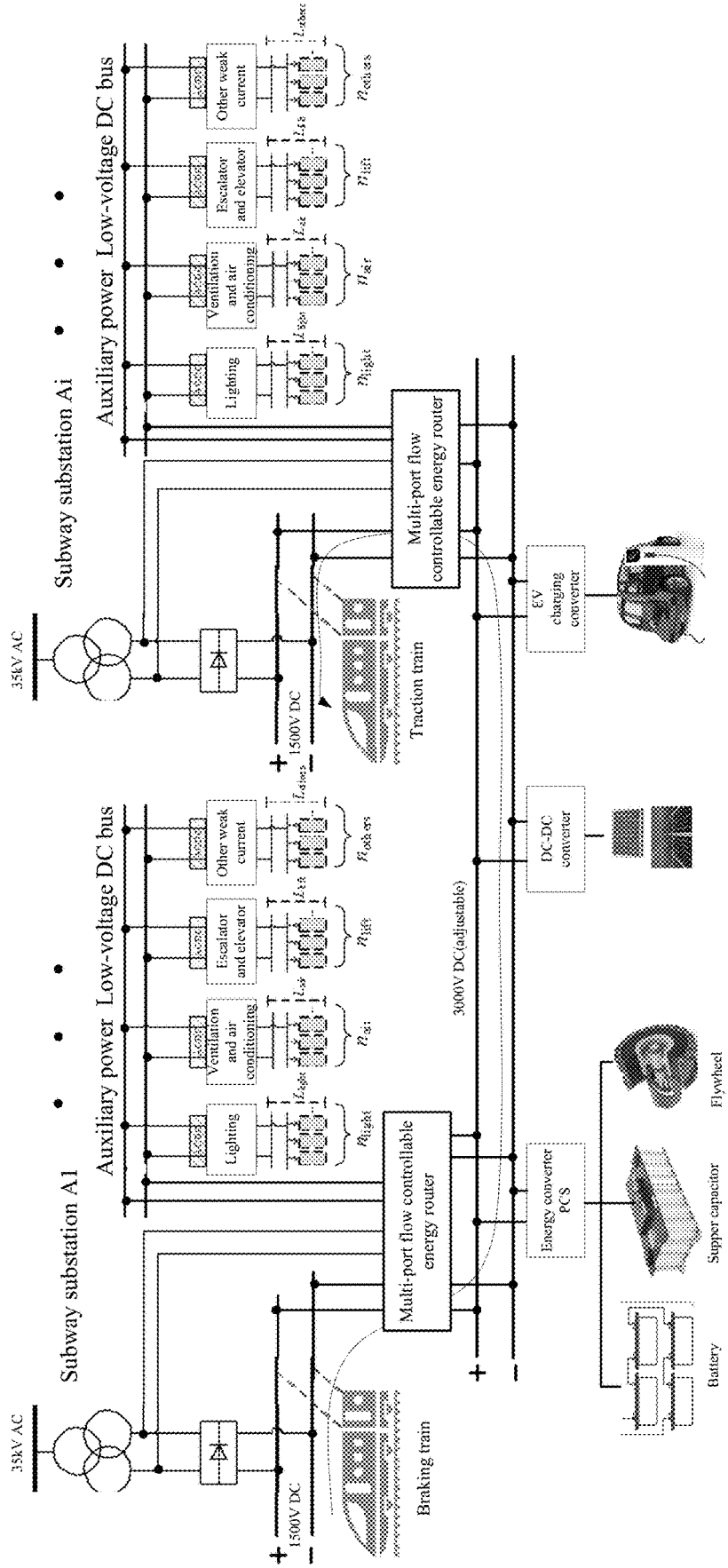
FIG. 1 schematically shows principles of an optimized energy interconnection system for an urban railway train.

As shown in FIG. 1, the present disclosure discloses an optimized energy interconnection system for an urban railway train. The system includes a DC intermediate bus and a multi-port flow controllable energy router. The multi-port flow controllable energy router is connected to the DC intermediate bus and a DC traction bus respectively, for directionally transferring regenerative braking energy from the DC traction bus. Since a DC path, i.e., the DC intermediate bus, is disposed, the multi-port flow controllable energy router can actively transfer the regenerative braking energy directionally via the DC intermediate bus, so that the problem that the regenerative braking energy can only be cycled among trains in adjacent stations due to line impedance of a system without energy feedback can be avoided. By directionally transferring by the multi-port flow controllable energy router, the regenerative braking energy can be cycled among trains in an entire route of a subway as much as possible, thereby improving a utilization ratio of the regenerative braking energy.

In addition, a voltage of the DC traction bus may be flexibly controlled and stabilized at 1500 V or at an even higher voltage level by the multi-port flow controllable energy router to reduce voltage oscillation of a system, so that a vehicle-mounted braking resistor can be omitted.

In an embodiment, there is one multi-port flow controllable energy router or multiple multi-port flow controllable energy routers. When there are multiple multi-port flow controllable energy routers (for example, when at least one multi-port flow controllable energy router is disposed in each traction substation), the multiple multi-port flow controllable energy routers communicate with each other. That is, interconnection of both energy and information may be realized for each of the multi-port flow controllable energy routers.

The multi-port flow controllable energy router includes a reactive power compensation device, an active power filter and a regenerative braking energy feedback device. That is, the multi-port flow controllable energy router has a function of reactive power compensation, a function of active power filtering and a function of regenerative braking energy feedback. In this way, the power quality adjustment device in a traditional system can be omitted, so as to improve economy of the system.

In addition to ports of various power supply mode (for example, AC, DC or voltage level), the multi-port flow controllable energy router further has a data collection module, a state monitoring module and an information communication module.

Besides, a control unit in the multi-port flow controllable energy router and a central control room in the traction substation communicate with each other, so as to accurately determine and control distribution of regenerative braking energy flows, thereby further forming a well-developed system for evaluating the usage of braking energy.

In an embodiment, an auxiliary power utilization system is changed from an AC system to a DC system. Specifically, the system further includes a low-voltage DC bus connected with an auxiliary power utilization unit, and each of the multi-port flow controllable energy routers is connected to the low-voltage DC bus. Since the auxiliary power utilization unit is connected with the low-voltage DC bus, parts such as an AC-DC conversion device at a leading end of the auxiliary power utilization unit and a power transformer connected in parallel with a 35 kV medium-voltage AD traction power grid can be omitted, so that more loads and controllable devices are provided for the energy absorption on the DC intermediate bus.

Herein, the auxiliary power utilization unit includes a lighting device, an air conditioning device, an escalator, an elevator and other weak current devices.

A photovoltaic grid-connected system is further connected to the DC intermediate bus. Specifically, the DC intermediate bus is connected with a photovoltaic array in the photovoltaic grid-connected system via a DC/DC converter. Specifically, the photovoltaic array (solar panels) is arranged on a roof of a station or a vehicle depot to perform photovoltaic power generation, so as to make energy on the DC intermediate bus more diversified. That is, the energy on the DC intermediate bus not only includes the regenerative braking energy but also includes new energy source such as the above photovoltaic electric energy.

Further, the DC intermediate bus is connected with a distributed power generation system. Herein, the distributed power generation system includes, but is not limited to, one or more of footstep generation devices, geothermal heating pumps, fuel cells and micro gas turbines.

In addition, energy exchange among buildings along a route of an urban railway train may also be incorporated into the distributed power generation system.

The DC intermediate bus is connected with energy storage elements via an energy converter. Herein, the energy storage element includes, but is not limited to, one or more of storage batteries, supper capacitors and flywheels.

Herein, the supper capacitor or the flywheel is a power-type energy storage element, which may quickly absorb or release energy and may be used to alleviate power impact to a subway traction power supply system (reduce a peak power of a multi-pulse rectifier transformer of a traction power grid) when a train arrives at or leave a station, thereby the designed (overload) capacity of the supper capacitor or the flywheel can be reduced to a certain extent; and an energy storage battery has a high energy density and may absorb more surplus regenerative braking energy or surplus photovoltaic power, so that braking resistance can be reduced or eliminated.

A load unit is connected to the DC intermediate bus. The load unit includes an electric vehicle charging system, and the electric vehicle charging system is connected with the DC intermediate bus via an electric vehicle charging converter. That is, an electric vehicle is united with railway transportation to form energy interconnection of public transportation, so as to maximize energy utilization efficiency of a transportation system.

As shown in FIG. 1, regenerative braking energy of a braking train (for example, at station A1) is actively guided to a traction train (for example, at station Ai) via a multi-port flow controllable energy router, to provide activation power to the outgoing train.

It should be noted that, the above station Ai is any station in an entire route of trains, so that the multi-port flow controllable energy router can guide the regenerative braking energy based on a principle of "first to a train in a short distance, then to a train in a long distance" or "according to needs". In this way, the problem that the regenerative braking energy can only be cycled among trains in adjacent stations due to line impedance of a system without energy feedback can be avoided, so that the regenerative braking energy can be cycled among trains in the entire route of a subway as much as possible, thereby improving a utilization ratio of the regenerative braking energy.

Hence, compared with a traditional subway system equipped with energy feedback devices, the energy interconnection system for an urban railway train according to the present disclosure may directionally control the regenerative braking energy, has no power loss in the route, and does not require equipping of a grid-connected power transformer.

Figure 2:
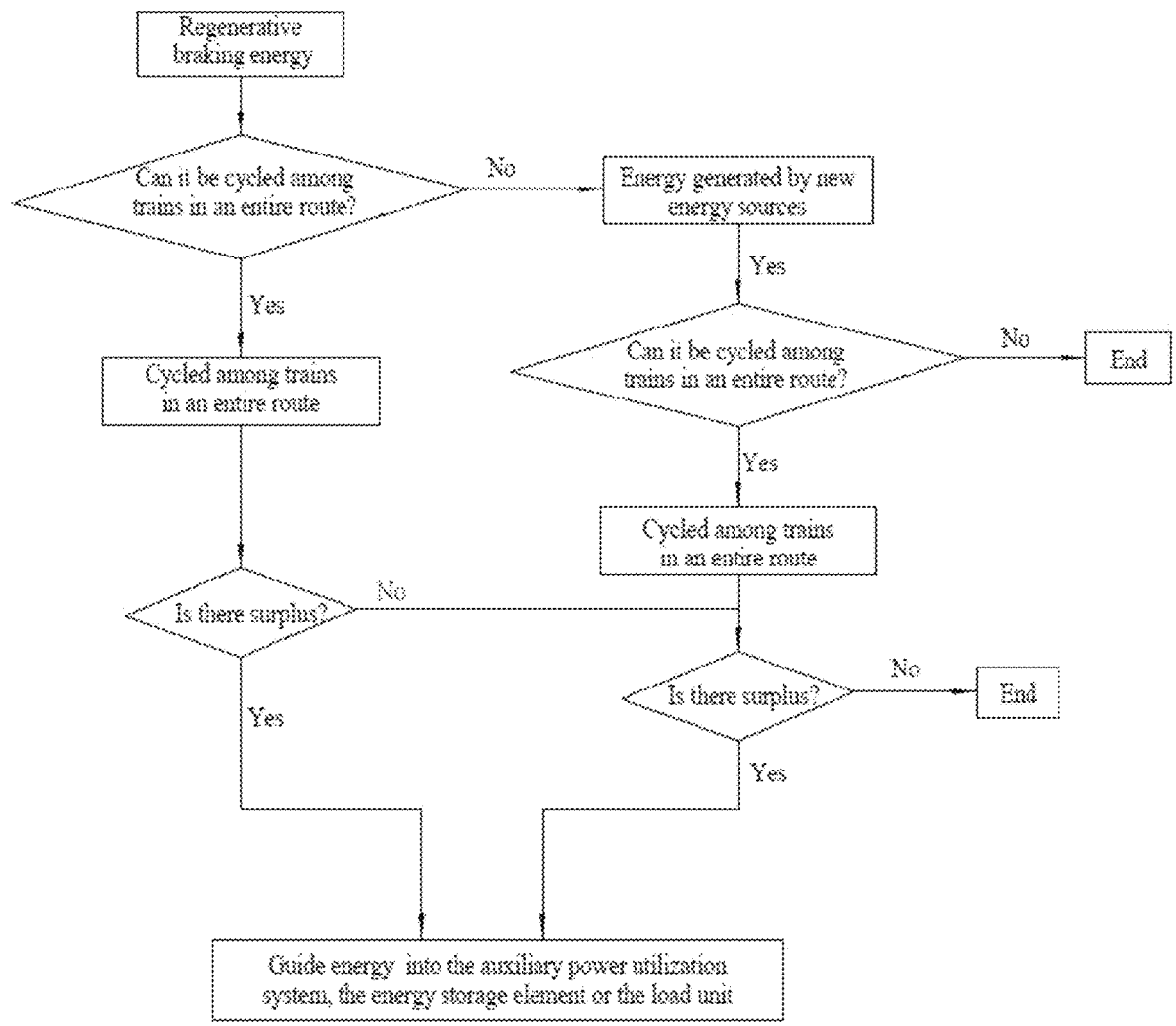
FIG. 2 shows a flowchart of control by a multi-port flow controllable energy router during implementation of the present disclosure.

As shown in FIG. 2, control of the regenerative braking energy by the multi-port flow controllable energy router is as follows:

at a first step, it is determined whether the regenerative braking energy can be cycled among trains in the entire route, and the regenerative braking energy is cycled among trains in the entire route if the answer is yes, the process proceeding to a second step; and if the answer is no, the process proceeds to a third step;

at the second step, it is determined whether there is surplus energy after the regenerative braking energy is cycled among trains in the entire route, and surplus energy is guided into the energy storage element or the auxiliary power utilization system if the answer is yes; and if the answer is no, the process proceeds to a fourth step;

at the third step, it is determined whether energy generated by new energy source (for example, surplus photovoltaic power) can be cycled among trains in the entire route, and the energy generated by new energy source is cycled among trains in the entire route if the answer is yes; and if the answer is no, the process ends;

at the fourth step, it is determined whether there is surplus energy after the energy generated by new energy source is cycled among trains in the entire route, and surplus energy is guided into auxiliary power utilization system, the energy storage element or the load unit if the answer is yes; and if the answer is no, the process ends;

In this way, regenerative braking energy of trains, the auxiliary power utilization unit of the traction substation such as cooling, heating, and lighting, a photovoltaic power generation system, the energy storage element and the electric vehicle charging system are interconnected by the multi-port flow controllable energy router, so that an energy interconnection system for an urban railway train that integrates source (for example, the regenerative braking energy and the new energy source), grid (for example, the DC power grid), load (for example, the electric vehicle charging system), storage (for example, the storage element) and control (for example, the central control room) is created. By reasonable allocating and scheduling energy of the entire grid with the multi-port flow controllable energy router, regenerative energy in the system (including the generative braking energy and the energy generated by new energy source) is absorbed by nearby trains, so as to reduce energy transmission loss and improve a utilization ratio of the energy.

A voltage of the DC intermediate bus is adjusted by the multi-port flow controllable energy router, so that the voltage of the DC intermediate bus is maintained at a suitable voltage level, for example, at 1500 V, 2000 V, 6000 V and so on.

In an alternative embodiment, the multi-port flow controllable energy router is further connected with an AC bus, so that the regenerative braking energy can be cycled and utilized among trains in the entire route via the AC bus.

Alternatively, in an embodiment of the present disclosure, the multi-port flow controllable energy router has a MMC-based topology.

Figure 3:
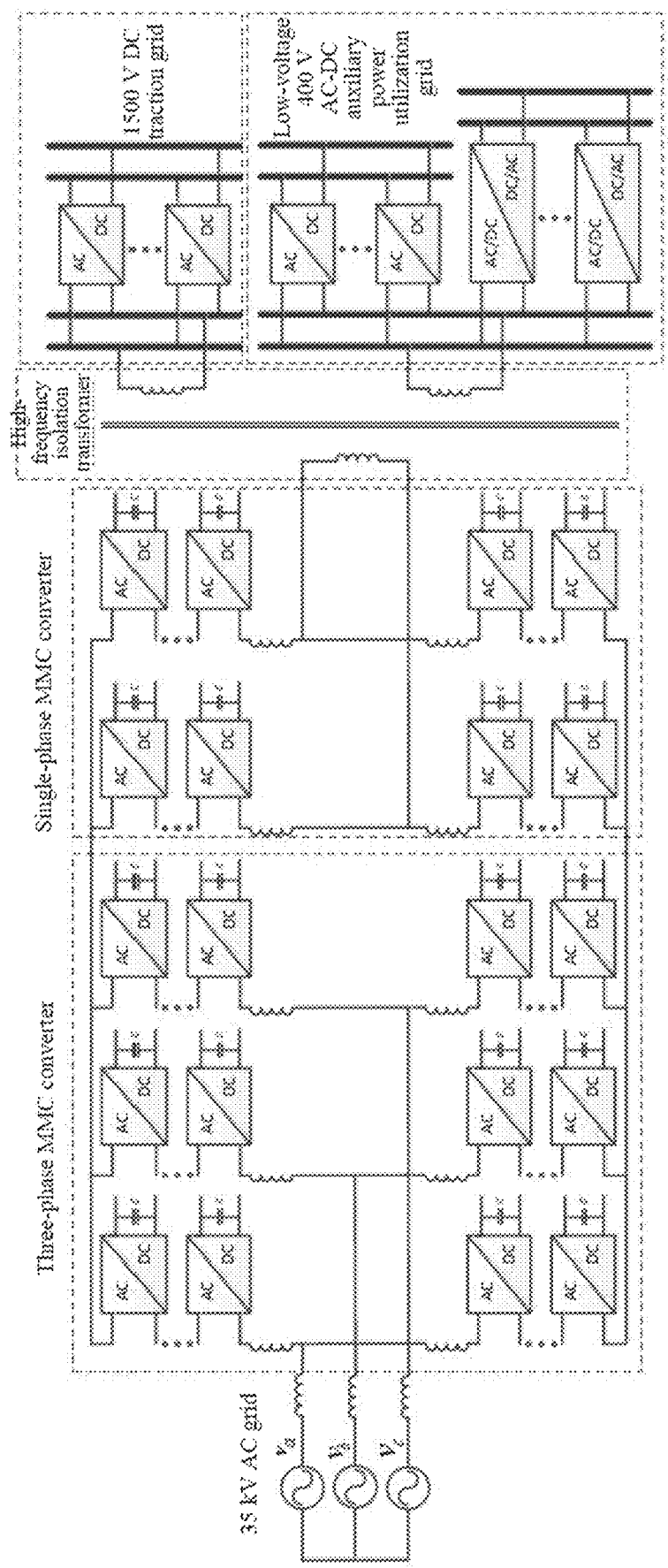
FIG. 3 shows a topology of a multi-port flow controllable energy router according to an embodiment of the present disclosure.

Specifically, as shown in FIG. 3, a topological leading end of a multi-port flow controllable energy router is connected with a 35 kV grid by using a three-phase MMC converter, to convert an alternative current into a medium-voltage direct current; and then the medium-voltage direct current is converted into a high-frequency alternative current by a single-phase MMC converter, and then electric energy is transferred to a 1500 V DC traction power grid and a low-voltage 400 V AC-DC auxiliary power utilization grid via a high-frequency isolation transformer.

Herein, each submodule of a MMC may be in the form of full-bridge or half-bridge. A submodule DC bus is connected in parallel with the super capacitor or the energy storage battery, so that distributed storage of the regenerative braking energy or energy generated by new energy source can be realized. Moreover, energy stored can be released, according to actual needs, to equipment in need of power, so as to alleviate impact to a system by pulsed power of a train.

In addition, a 1500 V DC traction power grid is coupled with a low-voltage 400 V AC-DC auxiliary power utilization grid via a transformer winding, so as to realize transfer of regenerative braking energy of a train by the 1500 V DC traction power grid to the auxiliary power utilization grid. It is certain that energy of the 1500 V DC traction power grid and the low-voltage auxiliary power utilization grid may also be transferred to the 35 kV grid via the multi-port flow controllable energy router.

Alternatively, in an embodiment of the present disclosure, the multi-port flow controllable energy router has a cascade H-bridge plus LLC resonant circuit based topology.

Figure 4:
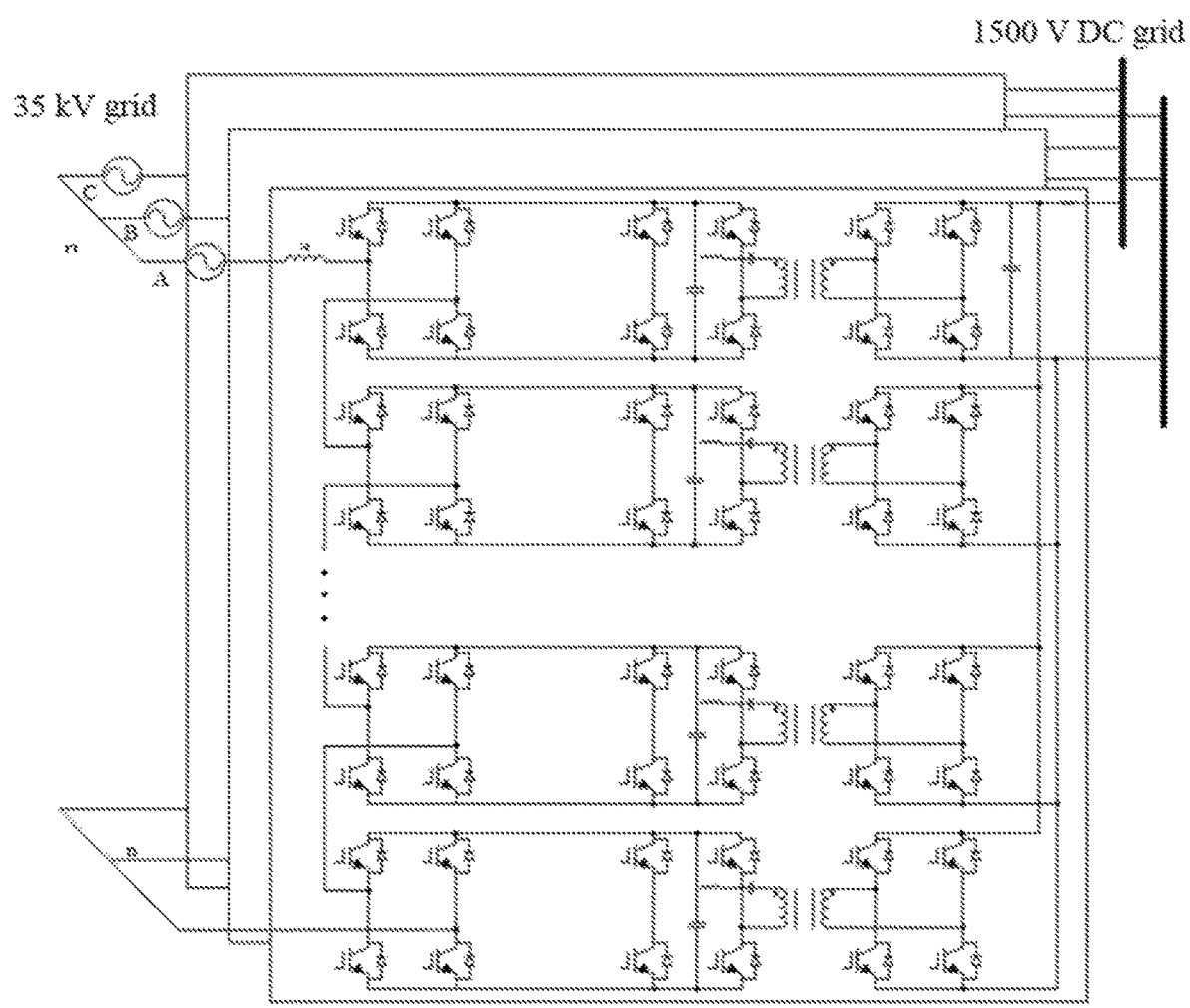
FIG. 4 shows a topology of a multi-port flow controllable energy router according to another embodiment of the present disclosure.

Specifically, as shown in FIG. 4, a topology of a multi-port flow controllable energy router is connected with a 35 kV grid by using a three-phase cascade H bridge topology, so as to convert an AC current to a DC current; and a DC side of each H bridge is connected to an LLC resonant converter, so as to convert a DC voltage into a DC voltage having a voltage level required by a load.

In the present embodiment, the above topology is in series connection with an input end of the 35 kV power grid, and is in in parallel with an output end of the 35 kV power grid for the 1500 V DC traction power grid. A voltage at the output end is adjustable, so as to supply power to a low-voltage auxiliary grid. Likewise, regenerative braking energy of a train may be transferred either from the 35 kV grid to the 1500 V DC traction power grid or from the 1500 V DC traction power grid to the 35 kV grid. It should be noted that, in order to improve safety, an isolation transformer is used in the topology of the multi-port flow controllable energy router in the above embodiment, and it is certain that other topologies having a bi-directional conversion function without the isolation transformer may also be used.

Moreover, a network topology, which allows bi-directional controlling of energy and has various ports, may be used as the topology of the multi-port flow controllable energy router. For example, one of a four-quadrant converter topology, a four-quadrant converter transformative topology, a three-level converter, a three-level converter transformative topology, a dual active bridge (DAB) and a dual active bridge (DAB) transformative topology.

Although the present disclosure has been described with reference to preferred embodiments, various changes may be made to the present disclosure, and parts therein may be replaced with equivalents without departing from the scope of the present disclosure. In particular, as long as there is no structural conflict, respective technical features in respective embodiments may be combined in any manner. The present disclosure is not limited to specific embodiments disclosed herein, but includes all technical solutions that fall into the scope of the claims.

The invention claimed is:

1. An optimized energy interconnection system for an urban railway train, wherein the system comprises a DC intermediate bus and a multi-port flow controllable energy router, wherein the multi-port flow controllable energy router is connected to the DC intermediate bus and a DC traction bus respectively, for directionally transferring regenerative braking energy from the DC traction bus, wherein the DC traction bus is used to supply power to trains in the entire route, and the voltage of the DC intermediate bus is higher than the voltage of the DC traction bus, wherein the system further comprises a low-voltage DC bus, to which an auxiliary power utilization unit is connected, and the multi-port flow controllable energy router is connected with the low-voltage DC bus, and when there is surplus energy after the regenerative braking energy is cycled among trains in the entire route, surplus energy is guided into the auxiliary power utilization system, wherein the multi-port flow controllable energy router is further connected with an AC bus, to make the regenerative braking energy cycled and utilized among trains in the entire route via the AC bus.

2. The optimized energy interconnection system for an urban railway train according to claim 1, wherein there is one multi-port flow controllable energy router or multiple multi-port flow controllable energy routers, wherein the multiple multi-port flow controllable energy routers communicate with each other.

3. The optimized energy interconnection system for an urban railway train according to claim 2, wherein the multi-port flow controllable energy router comprises a reactive power compensation device, an active power filter and a regenerative braking energy feedback device.

4. The optimized energy interconnection system for an urban railway train according to claim 1, wherein the DC intermediate bus is connected with a photovoltaic array in a photovoltaic grid-connected system via a DC/DC converter.

5. The optimized energy interconnection system for an urban railway train according to claim 1, wherein the DC intermediate bus is further connected with a distributed power generation system, wherein the distributed power generation system comprises one or more of footstep generation devices, geothermal heating pumps, fuel cells and micro gas turbines.

6. The optimized energy interconnection system for an urban railway train according to claim 1, wherein the DC intermediate bus is connected with energy storage elements via an energy converter, wherein the energy storage element comprises one or more of storage batteries, supper capacitors and flywheels.

7. The optimized energy interconnection system for an urban railway train according to claim 1, wherein a load unit is connected to the DC intermediate bus, wherein the load unit comprises an electric vehicle charging system which is connected with the DC intermediate bus via an electric vehicle charging converter.

8. The optimized energy interconnection system for an urban railway train according to claim 1, wherein a voltage of the DC intermediate bus is adjusted by the multi-port flow controllable energy router.

\* \* \* \* \*